US012619072B2

(12) United States Patent
Ben Nachouane et al.

(10) Patent No.: US 12,619,072 B2
(45) Date of Patent: May 5, 2026

(54) IMAGE-GENERATING DEVICE

(71) Applicant: VALEO COMFORT AND DRIVING ASSISTANCE, Créteil (FR)

(72) Inventors: Ayoub Ben Nachouane, Créteil (FR); Laurent Delpierre, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 18/705,180

(22) PCT Filed: Sep. 28, 2022

(86) PCT No.: PCT/EP2022/077060
§ 371 (c)(1),
(2) Date: Apr. 26, 2024

(87) PCT Pub. No.: WO2023/072520
PCT Pub. Date: May 4, 2023

(65) Prior Publication Data
US 2025/0044591 A1      Feb. 6, 2025

(30) Foreign Application Priority Data

Oct. 28, 2021    (FR) ...................................... 2111506

(51) Int. Cl.
G02B 27/01          (2006.01)

(52) U.S. Cl.
CPC .... G02B 27/0149 (2013.01); G02B 2027/015 (2013.01)

(58) Field of Classification Search
CPC ...................... G02B 2027/015; G02B 27/0149
See application file for complete search history.

(56) References Cited

U.S. PATENT DOCUMENTS 8,702,247 B2 * 4/2014 Amano ................ H04N 9/3141
359/838
2002/0140874 A1 * 10/2002 Hayashi ............... H04N 1/1013
348/838

(Continued)

FOREIGN PATENT DOCUMENTS

DE       102018126476 A1 *  4/2020   ............. B60K 35/00

OTHER PUBLICATIONS

International Search Report in corresponding International Application No. PCT/EP2022/077060, dated Nov. 25, 2022 (5 pages).

(Continued)

*Primary Examiner* — Md N Haque
(74) *Attorney, Agent, or Firm* — Osha Bergman Watanabe & Burton LLP

(57)          ABSTRACT

An image-generating device is disclosed. The image-generating device includes a light source configured to emit a light beam, a reflector configured to reflect the light beam toward an array of elements with variable transmittance, and a protective cover for the array of elements with variable transmittance attached to the array of elements with variable transmittance. The device includes a main housing configured to be attached to a support of the light source. The light source and the reflector are clamped between the support and the main housing attached to the support. The array of elements with variably transmittance are clamped between the main housing and the protective cover attached to the main housing.

14 Claims, 6 Drawing Sheets

(56)            References Cited

U.S. PATENT DOCUMENTS

| 2003/0156424 A1* | 8/2003 | Grutze | G09F 19/18 |
| | | | 362/514 |
| 2005/0062396 A1* | 3/2005 | Yang | G09F 9/33 |
| | | | 313/470 |
| 2005/0174473 A1* | 8/2005 | Morgan | H05B 47/196 |
| | | | 348/370 |
| 2006/0232844 A1* | 10/2006 | Nakajima | G02B 26/123 |
| | | | 359/198.1 |
| 2016/0161742 A1* | 6/2016 | Yonemoto | G02B 27/0149 |
| | | | 349/11 |
| 2019/0097722 A1* | 3/2019 | McLaurin | G02B 19/0057 |

OTHER PUBLICATIONS

Written Opinion in corresponding International Application No. PCT/EP2022/077060, dated Nov. 25, 2022 (5 pages).

* cited by examiner

[Fig. 1]
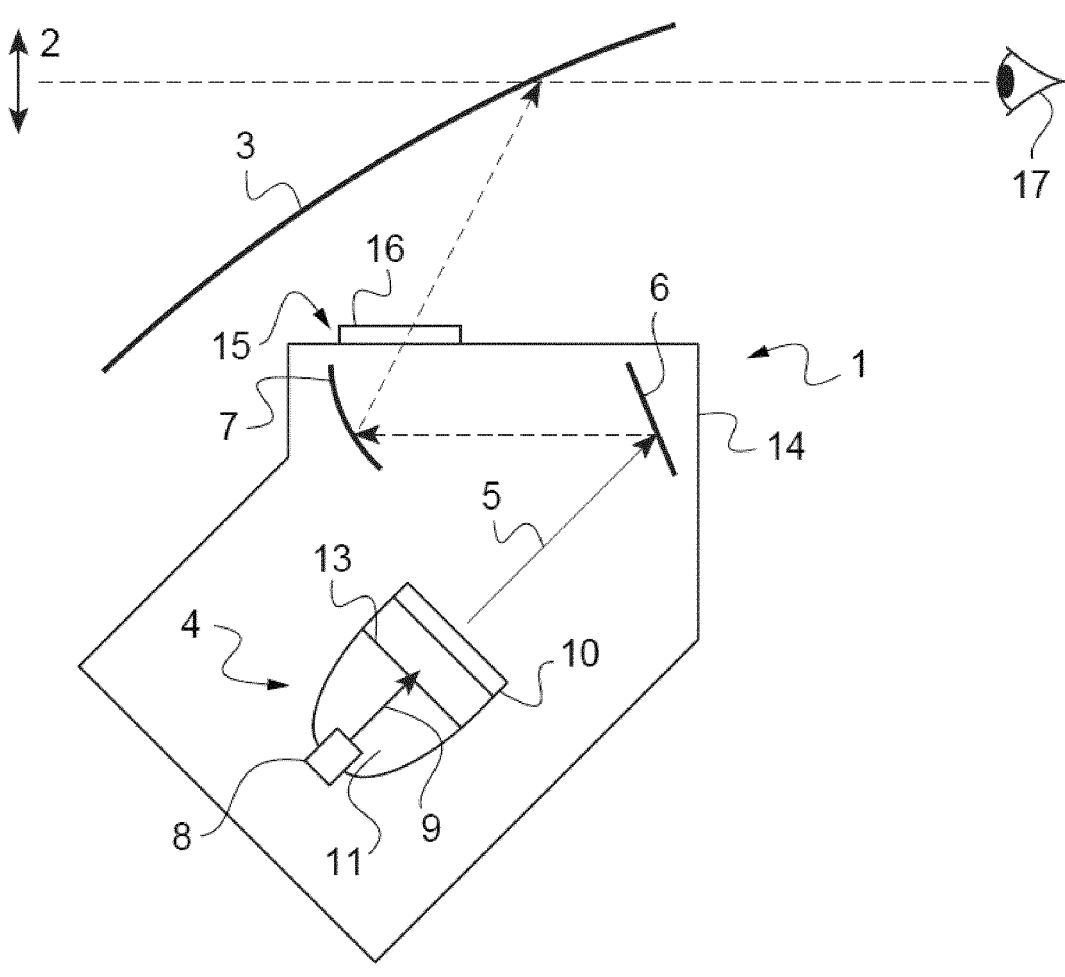

[Fig. 2]
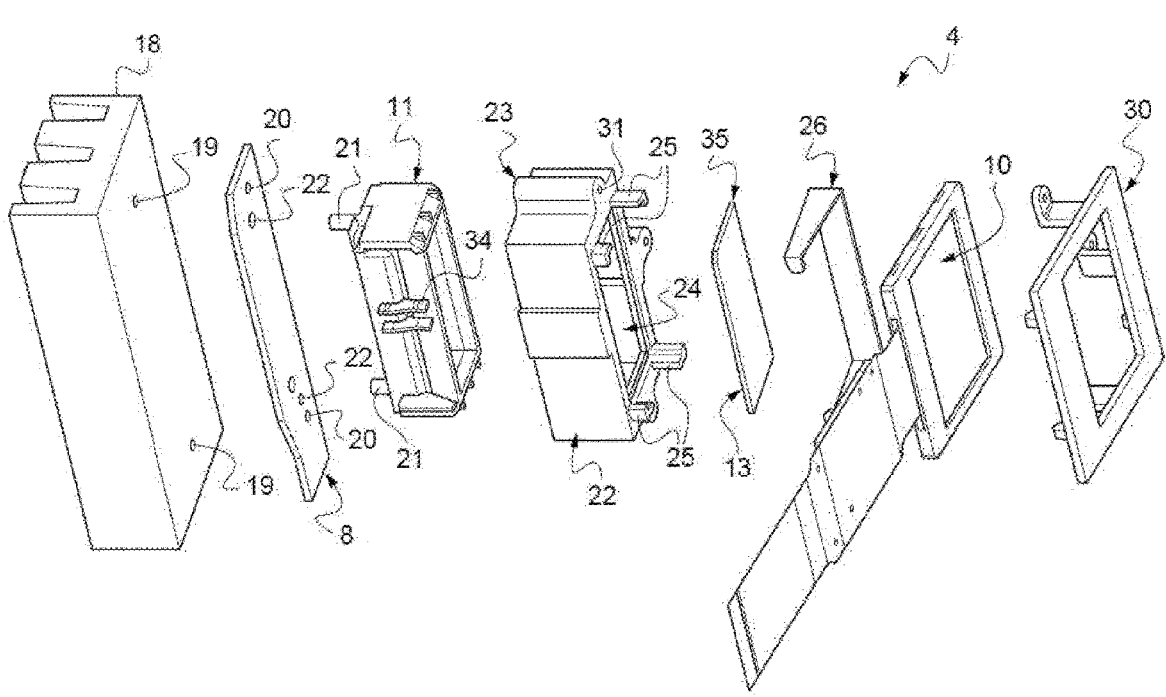

[Fig. 3]
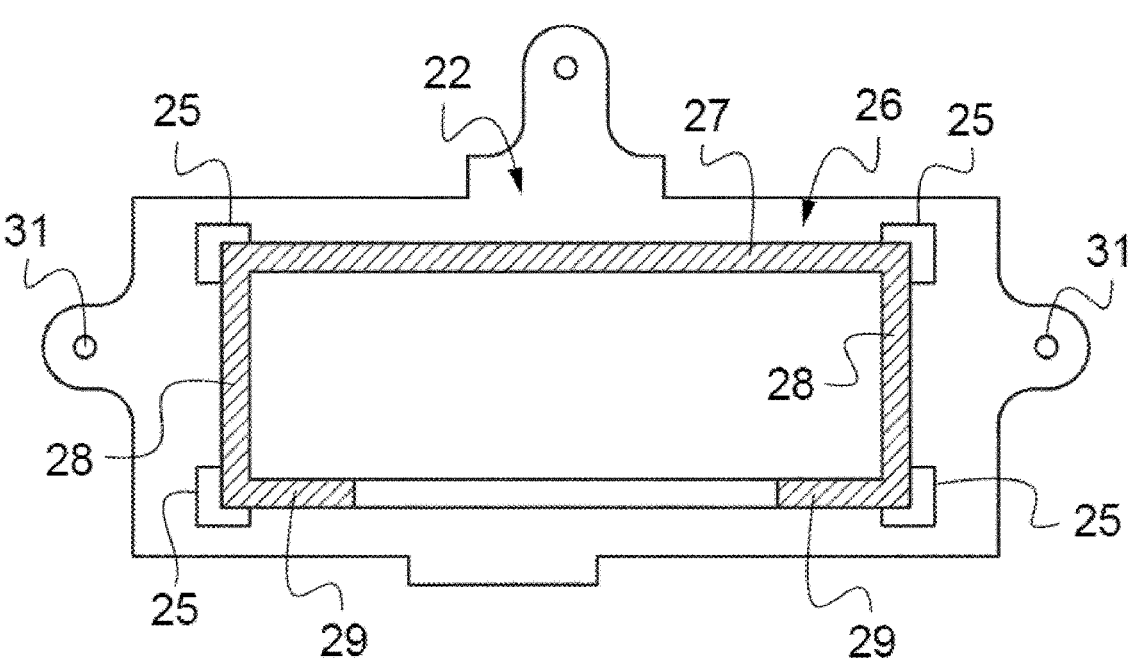

[Fig. 4]
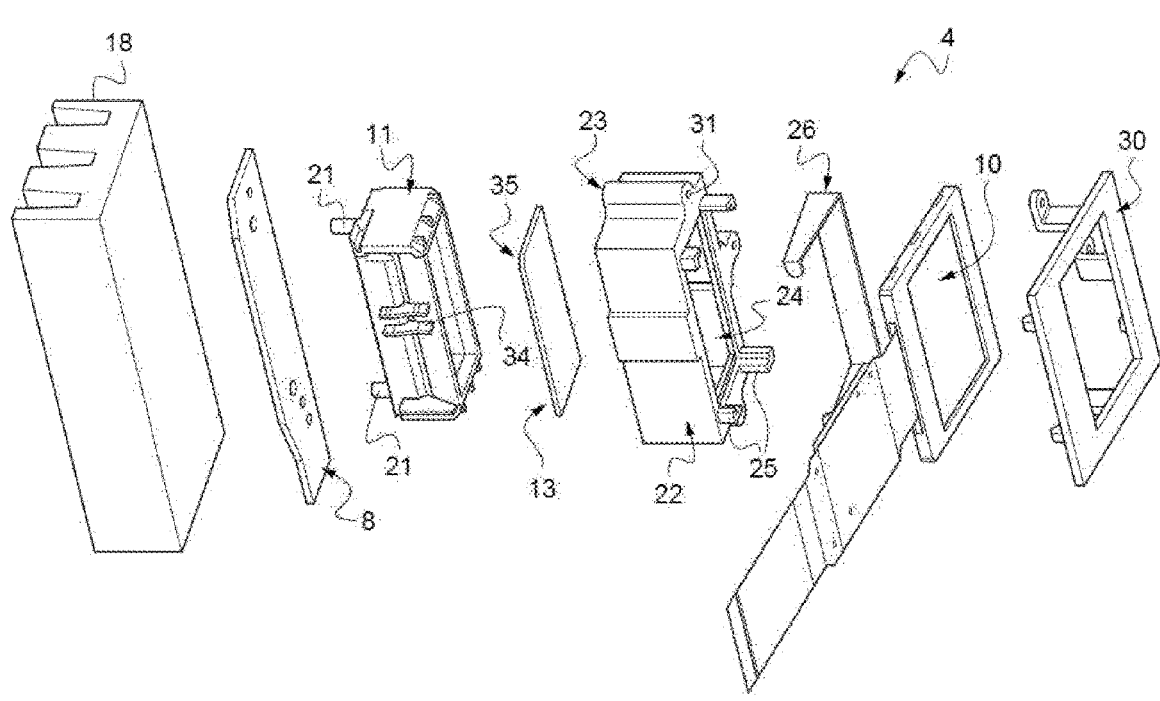

[Fig. 5]
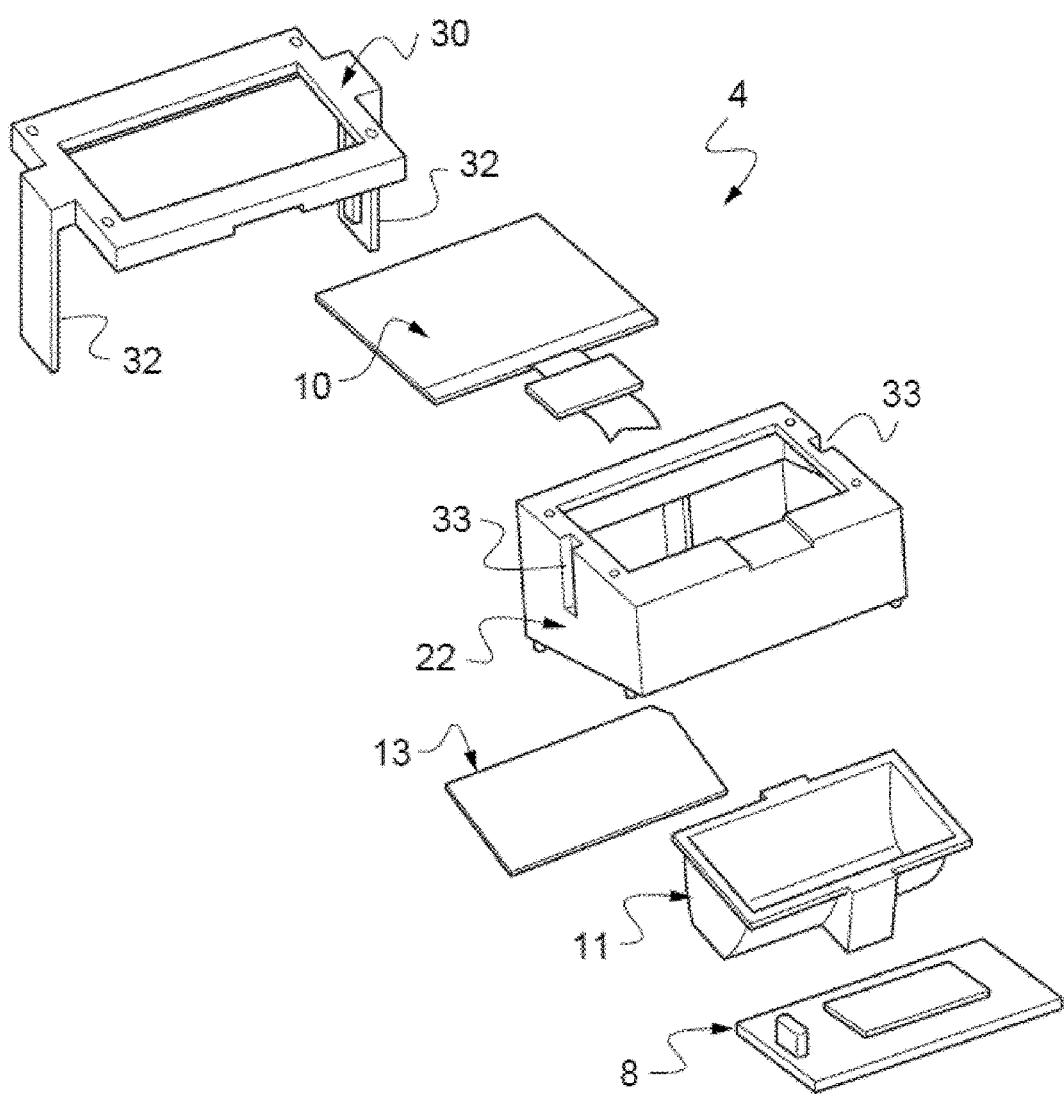

[Fig. 6]
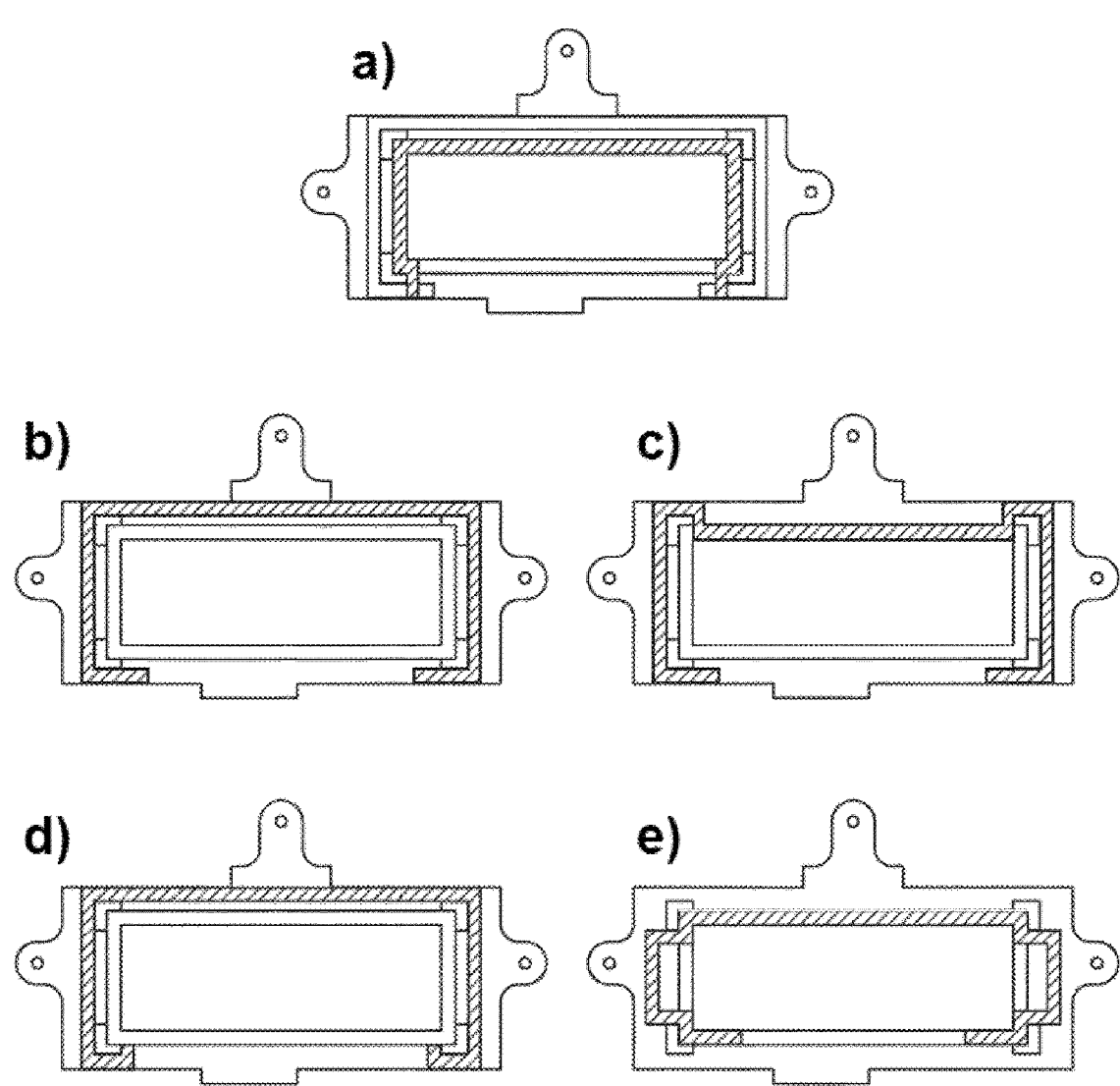

IMAGE-GENERATING DEVICE

TECHNICAL FIELD

The present invention relates to the technical field of display systems, notably to the technical field of image projection systems.

The invention more specifically relates to an image-generating device and a head-up display comprising such a device and notably adapted for use in a motor vehicle.

TECHNOLOGICAL BACKGROUND

In the above field, a head-up display is a device for displaying driving assistance information in the field of view of the driver.

To this end, head-up displays comprise an image-generating device, for example, a light source coupled to an array of elements with variable transmittance, for example, a liquid-crystal display (LCD), and an optical system for transmitting images to a partially transparent strip, for example, in order for the driver to be able to see the images without looking away from the road.

In order to generate a good quality image, the head-up displays comprise numerous optical (reflector, collimator), thermal (dissipator) and mechanical elements, which can be complex to assemble.

SUMMARY OF THE INVENTION

In order to overcome the aforementioned problem of the prior art, a head-up display is proposed that allows simple assembly of its various constituent elements.

According to one aspect of the invention, an image-generating device is proposed comprising a light source configured to emit a light beam, a reflector configured to reflect the light beam toward an array of elements with variable transmittance, and a protective cover for the array of elements with variable transmittance attached to the array of elements with variable transmittance, characterized in that the device comprises a main housing configured to be attached to a support of the light source, with the light source and the reflector being clamped between the support and the main housing attached to the support, the array of elements with variable transmittance being clamped between the main housing and the protective cover attached to the main housing.

Attaching the parts of the device by clamping advantageously allows the number of attachment elements to be reduced and therefore simplifies the assembly of the device.

According to one embodiment, the outer surface of the main housing comprises outer centering grooves, with the protective cover comprising centering tabs each configured to be inserted into a corresponding outer centering groove.

Thus, by virtue of the centering grooves, the alignment of the elements of the device with one another is ensured, which further simplifies the assembly of the device.

According to one embodiment, the reflector is configured to be inserted into the main housing, with a collimator being placed in the main housing and being clamped between the reflector and an inner surface of the main housing.

According to one embodiment, an outer face of the main housing comprises a housing configured to receive a collimator, with the collimator being clamped between the main housing and the array of elements with variable transmittance.

According to one embodiment, the inner surface of the main housing comprises centering grooves, with the reflector comprising centering tabs that are produced on its outer surface and are each configured to be inserted into a corresponding inner centering groove.

According to one embodiment, the device comprises a heat sink clamped between the main housing and the array of variable transmittance elements.

According to one embodiment, a face of the main housing comprises a plurality of centering pins, with the heat sink being configured to be clamped around the centering pins.

According to one embodiment, the main housing is made of a material exhibiting thermal conductivity that is greater than or equal to 20 $W \cdot m^{-1} \cdot K^{-1}$.

Thus, it is possible to dispense with an additional heat sink, which allows the spatial requirement of the device to be reduced.

According to one embodiment, the wall of the main housing comprises a plurality of fins.

According to one embodiment, the main housing is coupled to a forced-convection cooling module.

According to one embodiment, the main housing is attached to the support by means of a screw.

According to one embodiment, the protective cover is attached to the housing by clipping.

According to one embodiment, the protective cover is attached to the housing by means of a screw.

According to another aspect, a head-up display is proposed, notably for a motor vehicle, comprising an image-generating device according to the invention.

Of course, the various features, alternative embodiments and embodiments of the invention can be associated with one another in various combinations insofar as they are not incompatible or mutually exclusive.

BRIEF DESCRIPTION OF THE FIGURES

In addition, various other features of the invention will become apparent from the accompanying description that is provided with reference to the drawings, which illustrate non-limiting embodiments of the invention, and in which:

FIG. 1 schematically illustrates a head-up display comprising an image-generating device according to one embodiment of the invention;

FIG. 2 is an exploded view of an image-generating device according to one embodiment of the invention;

FIG. 3 illustrates a heat sink for an image-generating device according to the invention;

FIG. 4 is an exploded view of an image-generating device according to another embodiment of the invention;

FIG. 5 is an exploded view of an image-generating device according to another embodiment of the invention;

FIG. 6 illustrates alternative embodiments of the heat sink of FIG. 3.

It should be noted that throughout these figures the structural and/or functional elements common to the various alternative embodiments can have the same reference signs.

FIG. 1 schematically shows the main elements of a head-up display 1 intended, for example, to be fitted to a vehicle, notably a motor vehicle.

Such a display 1 is suitable for creating a virtual image 2 in the field of view of a driver of the vehicle, such that the driver can see this virtual image 2 and any information that it contains without having to look away.

To this end, the display 1 comprises a partially transparent strip 3 placed in the field of view of the driver, an image-generating device 4 suitable for generating a downstream light beam 5 and a projection device 6, 7 suitable for reflecting, in the direction of said partially transparent strip 3, the downstream light beam 5 generated by the image-generating device 4.

The partially transparent strip 3 in this case is coincident with the windscreen of the vehicle. In other words, it is the windscreen of the vehicle that acts as a partially transparent strip for the head-up display 1. This configuration is particularly suitable for projecting augmented reality images.

As an alternative embodiment, the partially transparent strip could be a combiner, i.e., a partially transparent strip separate from the windscreen and intended for the head-up display. Such a combiner would be placed between the windscreen of the vehicle and the eyes 15 of the driver, on the route of the downstream light beam 5.

The head-up display 1 in this case comprises two folding mirrors 6, 7 arranged so as to reflect the downstream light beam 5 generated by the image-generating device 4 in the direction of the partially transparent strip 3. The folding mirrors 6 and 7 advantageously allow the image-generating device 4 to be set to a configuration in which it does not face the partially transparent strip 3 and therefore to be placed in any suitable place, typically under the dashboard of the vehicle.

For example, in this case, a first folding mirror 6 is a flat mirror and a second folding mirror 7 is a curved mirror that assumes a shape optimized for producing a virtual image assuming a shape suitable for the partially transparent strip 3, in this case a curved shape, so as to display the image without distortion. Furthermore, the second folding mirror 7 has a function of magnifying the image generated by the array of elements with variable transmittance.

According to other embodiments, the image projection device 4 can comprise a different number of mirrors and/or mirrors assuming different shapes, as well as other optical elements, for example, a lens.

The image-generating device 4 comprises a light source 8, in this case an array of light-emitting diodes (with "LED" being the acronym conventionally used by a person skilled in the art), which is configured to produce an upstream light beam 9, an array 10 of elements with variable transmittance, for example, in this case an LCD screen, which is configured to be illuminated by the upstream light beam 9, and a reflector 11 interposed between the light source 8 and the array 10 of elements with variable transmittance. In this case, the image-generating device 4 comprises an optical collimator 13, through which the downstream light beam 9 passes before reaching the array of elements with variable transmittance.

Within the meaning of the invention, the terms "upstream" and "downstream" refer to positions along the propagation path of the light emitted by the light source. Thus, the term "downstream" means closer to the light source and the term "upstream" means further from the light source, along the propagation path.

The array 10 of elements with variable transmittance is configured to selectively transmit the upstream light beam 9 so as to form the downstream light beam 5 representing the image 2 to be projected in the field of view of the driver by means of the partially transparent strip 3.

The head-up display device 1 also comprises a (generally opaque) housing 14 that contains the image-generating device 4 and the projection system 6, 7, notably in order to protect these elements against any external attacks (dust, liquids, etc.).

The housing 13 comprises an opening 15, through which the downstream light beam 5 passes, in this case after being reflected on the second folding mirror 7.

The opening 15 in the housing 13 is closed by a window 16 (sometimes called "cover window") formed, for example, from a sheet of polycarbonate plastic with a thickness ranging between 0.25 mm and 0.75 mm.

FIG. 2 is an exploded perspective view showing the image-generating device 4 in greater detail than in FIG. 1. In FIG. 2, various elements of the image-generating device 4 are shown spaced apart from one another along the propagation axis of the light beam.

The image-generating device 4 in this case comprises a support 18 for the light source 8, configured to receive the light source 8. In this case, the light source 8 comprises an electronic board comprising at least one light-emitting diode, for example, an array of light-emitting diodes.

The support 18 in this case is a passive heat sink made of a thermally conductive material and is configured to maintain the operating temperature of the light source 8 below its functional thermal limits, in this case below a temperature of $110°$ C. Thus, its conductivity is greater than $20 \ \mathrm{W \cdot m^{-1} \cdot K^{-1}}$, and preferably greater than $60 \ \mathrm{W \cdot m^{-1} \cdot K^{-1}}$. For example, in this case, the support 18 is made from aluminum and exhibits thermal conductivity of $220 \ \mathrm{W \cdot m^{-1} \cdot K^{-1}}$.

The support 18, acting as a passive heat sink, can comprise any other material that allows the aforementioned heat dissipation requirements to be met, for example, aluminum alloys or magnesium alloys.

The rear face of the support 18, i.e., the face opposite the face on which the light source 8 is attached, is provided with fins that allow the surface area of the first passive heat sink 24 that is in contact with the air to be increased and therefore allow heat exchanges with the outside to be increased.

Two through-holes 19 are provided in the support, for example, in this case holes adapted to the screw passages. Two corresponding holes 20 are provided in the electronic board of the light source 8, so as to be positioned facing the through-holes 19 of the support 18. Preferably, the screws are inserted from the rear face of the support 18, for example, between two fins.

The reflector 11 is directly in contact with the electronic board of the light source 8 and is positioned around the array of light-emitting diodes. It comprises two centering pins 21 configured to be inserted into two centering holes 22 provided in the electronic board of the light source 8, in this case blind holes.

The device 4 further comprises a main housing 22 configured to be placed in contact with the electronic board of the light source 8, around the reflector 11, so that the reflector 11 is housed in the main housing 22.

The reflector 11 in this case comprises two centering tabs 34 produced on two opposite outer faces of the reflector 11, configured to be inserted into two corresponding inner centering grooves provided on inner faces of the main housing 22.

The main housing 22 comprises two first threaded holes 23 provided on its contact face with the electronic board of the light source 8 (upstream face relative to the direction of propagation of the beam), facing the through-holes 19 and 20, and is attached to the support by means of screws that pass through the holes 19, 20, and 23. Preferably, the screws are inserted from the rear face of the support 18.

When the main housing 22 is thus attached to the support 18, the reflector 11 located in the main housing 22 and the electronic board of the light source 8 are clamped between the support 18 and the main housing 22.

On the downstream face of the main housing 22, the edge of an opening 24 adapted for the passage of the beam, in this case a rectangular opening, comprises a shoulder that forms a housing for the collimator 13. Thus, when the collimator 13 is placed in the housing, it is kept immobile in any direction orthogonal to the direction of propagation of the beam.

In this case, one of the corners of the collimator 13 comprises a chamfer 35, and the shoulder forming the housing of the collimator has a complementary shape so as to be able to distinguish the upstream face of the collimator 13 from the downstream face when it is inserted.

Around the opening 24, four centering pins 25 extend from the main housing 22 parallel to the direction of propagation. In this case, the centering pins 25 assume corner shapes that conform to the contours of the opening 23 in the vicinity of its corners.

In this embodiment, the image-generating device 4 comprises a profiled passive heat sink 26 configured to be placed between the main housing 22 and the array of variable transmittance elements. The profiled passive heat sink 26 in this case is produced by cutting and folding a metal strip, an upstream edge face of which is in contact with the collimator 13 and a downstream edge face of which is in contact with the array 10 of variable transmittance elements.

In this case, as illustrated in FIG. 3, which is a view of the profiled passive heat sink 26 opposite its downstream edge face, the profiled passive heat sink 26 assumes a generally rectangular shape so as to tightly fit between the centering fingers 25 of the main housing. For example, in this case, the profiled passive heat sink 26 comprises a rectangular central portion 27 and two identical lateral portions 28, in the form of rectangular trapeziums, which each extend from one end of the central portion 27, so that the right angles of the rectangular trapeziums are at the level of the upstream edge face of the profiled passive heat sink 26. Two tabs 29 extend parallel to the central portion 27, each from one end of a distinct lateral portion 28.

In this case, the profiled passive heat sink 26 is made of aluminum.

The image-generating device 4 further comprises a protective cover 30 in contact with the downstream face of the array 10 of variable transmittance elements, which comprises means for attaching to the main housing 22, in this case screws configured to be inserted into second threaded holes 31 of the main housing 22. As an alternative embodiment, the protective cover 30 can be attached to the main housing by a clipping system.

Thus, the collimator 13, the passive heat sink 16 and the array 10 of variable transmittance elements are clamped between the main housing 22 and the protective cover 27. In particular, in this case, the profiled passive heat sink 26 is clamped between the collimator 13 and the array 10 of variable transmittance elements.

According to an alternative embodiment illustrated in FIG. 4, the collimator 13 is placed inside the main housing 22. Thus, in this embodiment, the collimator 13 is clamped between the reflector 11 and the main housing 22.

FIG. 5 illustrates another embodiment of the device according to the invention, in which the image-generating device comprises a system for centering the protective cover 30 on the main housing 22.

Thus, the protective cover 30 comprises two centering rails 32 that extend orthogonally from two opposite edges of the protective cover 30, so as to be inserted into two corresponding grooves 33 provided in two opposite edges of the main housing 22.

The main housing 22 and the protective cover 30 can be made of any material. However, in some embodiments, in order to improve the heat dissipation of the image-generating device 4, the protective cover and/or the main housing 22 can be made of thermally conductive materials, for example, aluminum. In such embodiments, the outer surface of the main housing 22 can be provided with fins for increasing the heat exchange surface with the environment, and/or can be coupled to an active cooling module, for example, a forced-convection cooling module such as a fan.

In some of these embodiments where the housing acts as a heat sink, the image-generating device 4 is devoid of the profiled passive heat sink 26.

In the embodiments described above, the passive heat sink 26 assumes a generally rectangular shape. As an alternative embodiment, the passive heat sink can assume other shapes, notably one of the five shapes a), b), c), d), e) illustrated in FIG. 6.

Various other modifications can be made to the invention within the scope of the appended claims.

The invention claimed is:

1. An image-generating device comprising:
a light source configured to emit a light beam;
a reflector configured to reflect the light beam toward an array of elements with variable transmittance; and
a protective cover for the array of elements with variable transmittance attached to the array of elements with variable transmittance,
wherein the device comprises a main housing configured to be attached to a support of the light source,
wherein the reflector is disposed within the main housing, such that the reflector and the main housing are in direct contact with an electronic board of the light source,
wherein the light source and the reflector are clamped between the support and the main housing attached to the support,
wherein the array of elements with variable transmittance are clamped between the main housing and the protective cover attached to the main housing.

2. The device as claimed in claim 1,
wherein the outer surface of the main housing comprises outer centering grooves,
wherein the protective cover comprises centering tabs each configured to be inserted into a corresponding outer centering groove.

3. The device as claimed in claim 1,
wherein a collimator is placed in the main housing and clamped between the reflector and an inner surface of the main housing.

4. The device as claimed in claim 1,
wherein an outer face of the main housing comprises a housing configured to receive a collimator,
wherein the collimator is clamped between the main housing and the array of elements with variable transmittance.

5. The device as claimed in claim 1,
wherein the inner surface of the main housing comprises centering grooves,
the reflector comprising centering tabs that are produced on its outer surface and are each configured to be inserted into a corresponding inner centering groove.

6. The device as claimed in claim 1,
comprising a heat sink clamped between the main housing and the array of variable transmittance elements.

7. The device as claimed in claim 6,
wherein a face of the main housing comprises a plurality of centering pins, wherein the heat sink is configured to be clamped around the centering pins.

8. The device as claimed in claim 1, wherein the main housing is made of a material exhibiting thermal conductivity that is greater than or equal to 20 $W \cdot m^{-1} \cdot K^{-1}$.

9. The device as claimed in claim 8, wherein the wall of the main housing comprises a plurality of fins.

10. The device as claimed in claim 8, wherein the main housing is coupled to a forced-convection cooling module.

11. The device as claimed in claim 1, wherein the main housing is attached to the support by means of a screw.

12. The device as claimed in claim 1, wherein the protective cover is attached to the main housing by clipping.

13. The device as claimed in claim 1, wherein the protective cover is attached to the main housing by means of a screw.

14. A head-up display comprising an image-generating device as claimed in claim 1.

* * * * *